United States Patent [19]
Hsu

[11] Patent Number: 5,865,870
[45] Date of Patent: *Feb. 2, 1999

[54] CONTINUOUS RELEASE PHOSPHORUS FERTILIZER

[76] Inventor: Hsinhung John Hsu, 4951 Olivas Park Dr., Ventura, Calif. 93003

[21] Appl. No.: 958,644

[22] Filed: Oct. 27, 1997

[*] Notice: The term of this patent shall not extend beyond the expiration date of Pat. No. 5,707,418.

Related U.S. Application Data

[63] Continuation-in-part of Ser. No. 788,860, Jan. 23, 1997, Pat. No. 5,707,418.
[51] Int. Cl.⁶ .................................. C05B 9/00; C05B 7/00
[52] U.S. Cl. .......................... 71/32; 71/33; 71/34; 71/64.1
[58] Field of Search .................................. 71/32, 33, 34, 71/64.1

[56] References Cited

U.S. PATENT DOCUMENTS

| | | | |
|---|---|---|---|
| 1,251,742 | 1/1918 | Blumenberg, Jr. | 71/34 |
| 4,336,053 | 6/1982 | Kenton | 71/40 |
| 5,162,600 | 11/1992 | Cody et al. | 71/33 |
| 5,489,323 | 2/1996 | Yoshida | 71/34 |
| 5,514,200 | 5/1996 | Lovatt | 71/11 |

*Primary Examiner*—Wayne Langel
*Assistant Examiner*—Melanie Wong
*Attorney, Agent, or Firm*—Gene W. Arant; Ralph D. Chabot

[57] ABSTRACT

Concentrated phosphorus fertilizers are described which are absorbed quickly into plant systems and improve plant growth. Particularly described are fertilizers having a combination of phosphorous acid or its salts thereof, and either (a) polyphosphoric acid and its salts thereof; or (b) phosphoric acid and its salts thereof. This combination phosphorus fertilizer, when combined within a specific ratio range, increases phosphorus uptake to plants thereby enhancing plant growth.

8 Claims, No Drawings

CONTINUOUS RELEASE PHOSPHORUS FERTILIZER

This is a continuation-in-part of prior application Ser. No. 08/788,860, filed Jan. 23, 1997, U.S. Pat. No. 5,707,418.

BACKGROUND

This invention relates to phosphorus fertilizers and in particular to a fertilizer having a combination of phosphorous acid or its salts thereof, and either (a) polyphosphoric acid and its salts thereof; or (b) phosphoric acid and its salts thereof. This combination phosphorus fertilizer, when combined within a specific ratio range, increases the phosphorus uptake to plants which enhances plant growth.

Fertilizers have long been used to supply needed nutrition to plants. The principal components of plant fertilizers have centered on three elements: nitrogen, phosphorus and potassium.

Phosphorus is not found in nature in its elemental form. The principal source of phosphorus for the fertilizer industry is obtained from the ores of phosphorus-containing minerals. The usual practice in the fertilizer industry is to convert phosphorus ores into a phosphorus product containing the phosphoric radical ($PO_4^{-3}$) which can be absorbed, although rather inefficiently, into plants and thereafter used as nutrition. It is well known in the prior art that phosphorus is biologically active and nutritionally useful to plants only in the phosphoric form ($PO_4^{-3}$). A common source of the phosphoric radical ($PO_4^{-3}$) for fertilizers is phosphoric acid.

Many of the phosphorus fertilizers currently used have a number of undesired qualities. First, if prepared in concentrated solutions, they must be used rather quickly; otherwise, the concentrated solution tends to form undesired precipitates. Further, they must be maintained within a narrow pH range to prevent precipitation, which results in fertilizers with limited application. Precipitates are undesirable since they cannot be absorbed by plants.

Still another problem with phosphorus containing fertilizers, particularly phosphoric fertilizers, is that they are not readily absorbed by foliage and must be applied to the soil and thereafter absorbed by the plant root system. Since only a small portion of the phosphoric fertilizer applied to the soil is actually absorbed by a root system, frequent reapplication usually occurs. This is undesirable because it can lead to leaching of phosphate into the groundwater which may cause eutrophication of lakes, ponds and streams.

Prior art formulas of phosphorus fertilizers have identified these problems. U.S. Pat. No. 5,514,200, issued to Lovatt, describes a formula utilizing the more readily absorbed phosphorous form ($PO_3^{-3}$) in a composition buffered with an organic acid. However, as is discussed below, the present invention represents an improved and more effective composition for providing phosphorus to plants.

SUMMARY

The present invention is directed to an improved and highly concentrated phosphorus fertilizer which is stable when stored for long periods of time and, when subsequently diluted and thereafter applied to plants and/or soil, can be easily absorbed through the foliage or the root system of a plant. The absorbed phosphorus is then used by plants to perform or accelerate their biological functions which are defined here to include plant growth, improve quality, improve disease resistance, and improved vigor.

The subject matter of my patent application bearing Ser. No. 08/788,860, filed Jan. 23, 1997 was directed to the combination of phosphorous acid or its salts dissolved in water and stabilized with an inorganic complexing agent such as polyphosphoric acid to prevent phosphorus or calcium phosphate precipitation. The present application is directed to polyphosphoric acid or its salts being utilized beyond the scope of a complexing agent to provide for a more efficient delivery of phosphorus to plants.

Subsequent testing, the results of which are provided below, has indicated that phosphorous acid or its salts, in combination with either (a) polyphosphoric acid or its salts, or (b) phosphoric acid or its salts, when used as a plant fertilizer, has a synergistic effect that improves plant growth more than if phosphorous, polyphosphoric or phosphoric fertilizers were used individually on plant systems.

The desired weight ratio of phosphorus derived from phosphorous acid or its salts to phosphorus derived from either (a) polyphosphoric acid or its salts, or (b) phosphoric acid or its salts, is between 1:10 to 10:1. However, the range can be from 1:20 to 20:1. Alternatively, (a) and (b) described above may be combined so that the weight ratio to phosphorous acid or its salts is between 1:20 to 20:1.

The present invention can function properly and remain dissolved in solution in the range of pH between 0.5 and 10.0. However, for application to plants, the fertilizer is preferably diluted to a pH range of between 5.0 and 7.5 for ideal absorption into plants either by foliar or soil applications.

Other features and advantages will become apparent to those skilled in the art upon review of the following detailed description and claims.

DESCRIPTION

A phosphorus fertilizer is prepared by mixing phosphoric acid or its salts or polyphosphoric acid or its salts with phosphorous acid or its salts. The phosphorus derived from phosphoric acid or its salts or polyphosphoric acid or its salts is designated as $PO_4\_P$, and phosphorus derived from phosphorous acid or its salts is designated as $PO_3\_P$. The ratio of $PO_4\_P$ to $PO_3\_P$ in the prepared phosphorus fertilizer ranges from 1:20 to 20:1. Mixing of $P_4\_P$ with $PO_3\_P$ produces a synergistic effect of $PO_4\_P$ and $PO_3\_P$ on plant growth and uptake of phosphorus by plants. Mixing of $PO_4\_P$ and $PO_3\_P$ also enables the preparation of high phosphorus liquid fertilizers with better stability and little, if any, precipitation. However, although liquid preparations are more desirable, dry preparations are also possible.

To prepare the fertilizer of the present invention, phosphorous acid or its salts $PO_3\_P$ are dissolved in water. The solution is then stabilized by adding $PO_4\_P$, added in intervals, until the $PO_4\_P$ constitutes within the range 1:20 to 20:1 by weight relative to the amount of $PO_3\_P$ present. The novel composition can be delivered to plants by either foliar or soil application. The phosphorus fertilizers so prepared are taken up by plants in the phosphorous form and are gradually converted by enzymes in the plants to phosphoric form to perform or accelerate biological functions in the plant.

Phosphorous acid is a genus which includes the following species: phosphorous acid, hypophosphorous acid, polyphosphorous acid, polyhypophosphorous acid.

Salts of phosphorous acid contemplated by this invention include but are not limited to ammonium phosphite, calcium phosphite, magnesium phosphite, manganese phosphite, potassium phosphate, sodium phosphite, zinc phosphite.

Phosphoric acid exists in the meta ($HOP_3$), pyro ($H_4P_2O_7$) and ortho ($H_3PO_4$) form. Salts of phosphoric acid contemplated by this invention include but are not limited to ammonium phosphate, calcium phosphate, ferrous phosphate, aluminum phosphate, ferric phosphate, magnesium phosphate, manganese phosphate, potassium phosphate, sodium phosphate, zinc phosphate.

Polyphosphoric acid or its salts function as complexing agents for minerals in water and prevent precipitation of phosphorus from phosphorous acid. Salts of polyphosphoric acid include but are not limited to potassium polyphosphate, ammonium polyphosphate, sodium polyphosphate, zinc polyphosphate, magnesium polyphosphate and iron polyphosphate. Polyphosphoric acid is a genus which includes the following species: polyphosphoric acid, dipolyphosphoric acid, tripolyphosphoric acid, tetra polyphosphoric acid, penta polyphosphoric acid, hexapolyphosphoric acid or combinations thereof.

The desired pH range for either soil or foliar application is between 5.0 and 7.5. However, the pH can be from 0.5 to 10.0.

In order to more clearly define the invention, the following examples of methods of preparation are set forth below. These examples are illustrative only and are not limiting as to the scope of the invention. Examples I, II, IV, VI, VII, X, XI and XII are typical fertilizer found in the prior art. Examples III, V, VIII, IX, XIII, XIV are embodiments of the present invention.

EXAMPLE I (PRIOR ART)
A 0-40-0 fertilizer was prepared by mixing the following:
(1) 535 grams water
(2) 465 grams phosphorous acid

EXAMPLE II (PRIOR ART)
A 0-40-0 fertilizer was prepared by mixing the following:
(1) 518 grams water
(2) 482 grams polyphosphoric acid

EXAMPLE III (PRESENT INVENTION)
A 0-40-0 fertilizer was prepared by mixing the following:
(1) 526.5 grams water
(2) 232.5 grams phosphorous acid
(3) 241 grams polyphosphoric acid

EXAMPLE IV (PRIOR ART)
A 0-40-0 fertilizer was prepared by mixing the following:
(1) 444 grams water
(2) 556 grams phosphoric acid

EXAMPLE V (PRESENT INVENTION)
A 0-40-0 fertilizer was prepared by mixing the following:
(1) 489.5 grams water
(2) 232.5 grams phosphorous acid
(3) 278 grams phosphoric acid In concentrated form, the fertilizer described in either Example III or V had a pH of 0.5 and was clear in appearance. Further, the fertilizers described in either Example III or V can be further diluted with water at ratios of concentrate to water up to 1:10,000 and used as soil application, with irrigation water or directly applied to the plant foliage.

EXAMPLE VI (PRIOR ART)
A 0-15-14 fertilizer having a pH of 6.7 was prepared by mixing the following:
(1) 657 grams water
(2) 175 grams phosphorous acid
(3) 168 potassium hydroxide

EXAMPLE VII (PRIOR ART)
A 0-15-14 fertilizer having a pH of 6.3 was prepared by mixing the following:
(1) 623 grams water
(2) 209 grams phosphoric acid
(3) 168 grams potassium hydroxide

EXAMPLE VIII (PRESENT INVENTION)
A 0-15-14 fertilizer having a pH of 6.5 was prepared by mixing the following:
(1) 640 grams water
(2) 87.5 grams phosphorous acid
(3) 104.5 grams phosphoric acid
(4) 168 grams potassium hydroxide

EXAMPLE IX (PRESENT INVENTION)
A 0-15-14 fertilizer having a pH of 6.5 was prepared by mixing the following:
(1) 640 grams water
(2) 83 grams phosphorous acid
(3) 99 grams phosphoric acid
(4) 10 grams polyphosphoric acid
(5) 168 grams potassium hydroxide

EXAMPLE X (PRIOR ART)
A 0-12-11 fertilizer having a pH of 6.4 was prepared by mixing the following:
(1) 728 grams water
(2) 140 grams phosphorous acid
(3) 132 grams potassium hydroxide

EXAMPLE XI (PRIOR ART)
A 0-12-11 fertilizer having a pH of 6.2 was prepared by mixing the following:
(1) 701 grams water
(2) 167 grams phosphoric acid
(3) 132 grams potassium hydroxide

EXAMPLE XII (PRIOR ART)
A 0-12-11 fertilizer having a pH of 6.2 was prepared by mixing the following:
(1) 723 grams water
(2) 145 grams polyphosphoric acid
(3) 132 grams potassium hydroxide

EXAMPLE XIII (PRESENT INVENTION)
A 0-12-11 fertilizer having a pH of 6.3 was prepared by mixing the following:
(1) 714.5 grams water
(2) 70 grams phosphorous acid
(3) 83.5 grams phosphoric acid
(4) 132 grams potassium hydroxide

EXAMPLE XIV (PRESENT INVENTION)
A 0-12-11 fertilizer having a pH of 6.3 was prepared by mixing the following:
(1) 725.5 grams water
(2) 70 grams phosphorous acid
(3) 72.5 grams polyphosphoric acid
(4) 132 grams potassium hydroxide The following is a tabular presentation of the fertilizers described in Examples X through XIV:

| Composition of Fertilizers in Examples X–XIV: (all values in grams) | | | | | |
|---|---|---|---|---|---|
| | Ex. X Prior Art | Ex. XI Prior Art | Ex. XII Prior Art | Ex. XIII | Ex. XIV |
| Water | 728 | 701 | 723 | 714.5 | 725.5 |
| Potassium hydroxide | 132 | 132 | 132 | 132 | 132 |
| Phosphorous acid | 140 | — | — | 70 | 70 |
| Phosphoric acid | — | 167 | — | 83.5 | — |
| Polyphosphoric acid | — | — | 145 | — | 72.5 |

EXPERIMENTS

Experiment 1—Dried Plant Analysis

The five fertilizer samples prepared as Examples I through V were diluted with water at a ratio of concentrate to water of 1:10,000. Each fertilizer solution was then applied as drench to separate pots each containing one tomato plant standing from 15–20 centimeters in height. Four plants were treated with each solution. Each plant received 500 milliliters of solution. Four plants were also used as a reference and received no fertilizer. Each pot also received 250 milliliters of water, twice per day. Each plant received its respective solution (500 ml) 5 separate times with 2 day intervals between each application. Forty five days after the first application of the solutions, the plants were cut at soil level, washed with dilute acid and distilled water and then dried in an oven at 75° C. for 24 hours. The dried plants were then weighed for dry matter and then analyzed for total phosphorus. The analysis results are as follows:

| EXPERIMENT 1 - DRIED PLANT ANALYSIS | | | | | |
|---|---|---|---|---|---|
| | Ex. I Prior art | Ex. II Prior art | Ex. III | Ex. IV Prior art | Ex. V | Water Only |
| Dry Matter (g/plant) | 21.6 | 22.9 | 25.1 | 23.2 | 26.4 | 20.8 |
| Total P (%) | 0.42 | 0.43 | 0.45 | 0.45 | 0.48 | 0.35 |
| Total P (g/plant) | .091 | .098 | .113 | .104 | .127 | .073 |

The novel fertilizer solution of Example III contains phosphorus fertilizers present in Examples I and II. The combination of polyphosphoric acid and phosphorous acid of Example III showed a 24.2% increase in the percent of phosphorus uptake and a 16.2% increase in dry matter over Example I. Similarly, Example III showed a 15.3% increase in the percent of phosphorus uptake and a 9.6% increase in dry matter over Example II.

The novel fertilizer solution of Example V contains phosphorus fertilizers present in Examples I and IV. The combination of phosphoric acid and phosphorous acid of Example V showed a 40.0% increase in the percent of phosphorus uptake and a 22.2% increase in dry matter over Example I. Similarly, Example V showed a 22.1% increase in the percent of phosphorus uptake and a 13.8% increase in dry matter over Example IV.

The test results indicate improved phosphorus uptake and increased plant mass by use of a combination phosphorus fertilizer; particularly the phosphorous acid/phosphoric acid combination of Example V.

Experiment 2—Stability Test

Examples VI, VII, VIII and IX were analyzed immediately after preparation. The results are shown in the following table. After the initial analysis, the samples were placed in containers and tightly covered with lids. After standing at room temperature for 48 hours, each sample was first visually observed for the presence of precipitates and thereafter filtered. The filtrates from each sample were analyzed for total phosphorus and potassium. The observations and analysis results are as follows:

| EXPERIMENT 2 - STABILITY TEST RESULTS | | | | |
|---|---|---|---|---|
| | Ex. VI Prior Art | Ex. VII Prior Art | Ex. VIII | Ex. IX |
| Analysis Results at Preparation | | | | |
| $P_2O_5$ (%) | 15.2 | 14.9 | 15.1 | 15.0 |
| $K_2O$ (%) | 14.0 | 13.7 | 14.3 | 14.1 |
| Appearance after 48 hours | Clear | Precipitation | Clear | Clear |
| Analysis Results after 48 hours | | | | |
| $P_2O_5$ (%) | 15.1 | 12.1 | 15.2 | 15.0 |
| $K_2O$ (%) | 14.0 | 12.7 | 14.2 | 14.0 |

The test results indicate that the novel phosphorus combination of Examples VIII and IX maintain phosphorus and potassium in solution. Also apparent is that phosphoric acid, when used in combination with phosphorous acid as in Example VIII, or when used in combination with phosphorous acid and polyphosphoric acid as in Example IX, remain in solution and do not form precipitates as indicated for Example VII.

Experiment 3—Foliar Application Test (7-Day)

Fertilizer samples X through XIV were each diluted with 250 times of water. The solutions were then sprayed onto tomato plants at 10 milliliters per plant. Each tomato plant had a height of between 15–20 centimeters prior to receiving the first application of solution. Eight plants were sprayed with each solution and also received 250 milliliters of water, twice daily. One week after the application of the solution, four plants from each treatment were cut at soil level, washed with dilute acid and distilled water and then dried in an oven at 75 degrees C. for 24 hours. The dried plants were then analyzed for total phosphorus and potassium. The results are as follows:

| EXPERIMENT 3 - DRIED PLANT ANALYSIS (7-Day) | | | | | |
|---|---|---|---|---|---|
| | Ex. IX Prior art | Ex. X Prior art | Ex. XI Prior art | Ex. XII | Ex. XIII | No Spray |
| Dry Matter (g/plant) | 5.88 | 6.86 | 5.94 | 6.89 | 6.25 | 6.17 |
| Total P (%) | 0.48 | 0.45 | 0.41 | 0.52 | 0.49 | 0.38 |
| Total K (%) | 1.86 | 1.79 | 1.72 | 1.82 | 1.75 | 1.69 |

Fertilizer examples IX, XII and XIII contain phosphorous acid.

The combination of polyphosphoric acid and phosphorous acid in Example XIII showed a 2.1% increase in the percent of phosphorus uptake and a 6.3% increase in dry matter over Example IX.

The combination of phosphoric acid and phosphorous acid in Example XII showed a 8.3% increase in the percent of phosphorus uptake and a 17.2% increase in dry matter over Example IX. Fertilizer examples XI and XIII contain phosphoric acid.

The combination of phosphoric acid and phosphorous acid in Example XII showed a 15.6% increase in the percent of phosphorus uptake and a 0.4% increase in dry matter over Example X. Fertilizer examples XI and XIII have polyphosphoric acid.

The combination of polyphosphoric acid and phosphorous acid in Example XIII showed a 19.5% increase in the percent of phosphorus uptake and a 5.2% increase in dry matter over Example XI.

Experiment 4 Foliar Application Test (45-Day)

The remaining four uncut plants from each treatment (Experiment 3) were kept in a greenhouse for a total of 45 days from the date of the first application of the solution. Each plant was watered twice per day (250 milliliters). At that time, they were cut at soil level, washed with dilute acid and distilled water and then dried in an oven at 75° C. for 24 hours. The dried plants were weighed for dry matter yields and then analyzed for total phosphorus and potassium. The dry matter yields and analysis are shown below:

EXPERIMENT 4 - DRIED PLANT ANALYSIS (45-Day)

|  | Ex. IX Prior art | Ex. X Prior art | Ex. XI Prior art | Ex. XII | Ex. XIII | No Spray |
|---|---|---|---|---|---|---|
| Dry Matter (g/plant) | 26.7 | 28.4 | 27.9 | 31.7 | 30.2 | 25.3 |
| Total P (%) | 0.38 | 0.41 | 0.36 | 0.45 | 0.40 | 0.36 |
| Total P (g/plant) | 0.101 | 0.116 | 0.100 | 0.143 | 0.121 | 0.091 |
| Total K (%) | 1.91 | 1.83 | 1.93 | 1.85 | 2.02 | 2.03 |
| Total K (g/plant) | 0.510 | 0.520 | 0.538 | 0.586 | 0.610 | 0.510 |

As in experiment 3, the prior art fertilizers of example IX, X and XI will be compared to examples XII and XIII; example XII; and example XIII, respectively.

The combination of polyphosphoric acid and phosphorous acid in Example XIII showed a 19.8% increase in phosphorus uptake and a 13.1% increase in dry matter over Example IX.

The combination of phosphoric acid and phosphorous acid in Example XII showed a 41.6% increase in phosphorus uptake and a 18.7% increase in dry matter over Example IX.

The combination of phosphoric acid and phosphorous acid in Example XII showed a 23.3% increase in phosphorus uptake and a 11.6% increase in dry matter over Example X.

The combination of polyphosphoric acid and phosphorous acid in Example XIII showed a 21.0% increase in phosphorus uptake and a 8.2% increase in dry matter over Example XI.

The results indicate that combinations of phosphorous acid with either phosphoric acid or polyphosphoric acid can enhance the uptake of phosphorus by plants. The test results also indicate that there is a synergistic effect by the combination of phosphorous acid with either phosphoric acid or polyphosphoric acid on plant growth.

I claim:

1. An improved concentrated phosphorus fertilizer comprising:
   (A) a first phosphorus containing component, selected from the group consisting of phosphorous acid, hypophosphorous acid, polyphosphorous acid, polyhypophosphorous acid, and salts thereof;
   (B) a second phosphorus containing component, selected from the group consisting of phosphoric acid and salts thereof and polyphosphoric acid and salts thereof;
   the ratio of said first phosphorus component to said second phosphorus component is in the range between one to twenty and twenty to one by weight; said concentrated phosphorus fertilizer being a stable solution; and when said concentrated phosphorus fertilizer is diluted with water, a substantially fully soluble fertilizer is formed having an acceptable pH which is suitable for phosphorus uptake by plants and wherein the combination of said components (A) and (B) improves phosphorus uptake by plants more than if an equivalent amount of either said component (A) or said component (B) were used alone.

2. The improved phosphorus fertilizer of claim 1 wherein said fertilizer, when diluted, has a pH of from about 5.0 to about 7.5.

3. A concentrated phosphorus fertilizer comprising:
   (A) a first phosphorus component selected from the group consisting of phosphorous acid, hypophosphorous acid, polyphosphorous acid, polyhypophosphorous acid, and salts thereof;
   (B) a second phosphorus component selected from the group consisting of polyphosphoric acid, dipolyphosphoric acid, tripolyphosphoric acid, tetra polyphosphoric acid, penta polyphosphoric acid, hexapolyphosphoric acid, potassium polyphosphate, ammonium polyphosphate, sodium polyphosphate, zinc polyphosphate, magnesium polyphosphate, and iron polyphosphate;
   the ratio of said first phosphorus component to said second phosphorus component is in the range between one to twenty and twenty to one by weight; said composition being substantially fully water soluble when diluted with water and having an acceptable pH which is suitable for phosphorus uptake by plants and wherein the combination of said components (A) and (B) improves phosphorus uptake by plants more than if an equivalent amount of either said component (A) or said component (B) were used alone.

4. The concentrated phosphorus fertilizer of claim 3 wherein said fertilizer, when diluted with water, has a pH of about 5.0 to 7.5.

5. A concentrated phosphorus fertilizer comprising:
   (A) a first phosphorus component selected from the group consisting of phosphorous acid, hypophosphorous acid, polyphosphorous acid, polyhypophosphorous acid, and salts thereof;
   (B) a second phosphorus component selected from the group consisting of phosphoric acid or salts thereof, the ratio of said first phosphorus component to said second phosphorus component is in the range between one to twenty and twenty to one by weight; said composition being substantially fully water soluble when diluted with water and having a foliage-acceptable pH and wherein the combination of said components (A) and (B) improves phosphorus uptake by plants more than if an equivalent amount of either said component (A) or said component (B) were used alone.

6. The concentrated phosphorus fertilizer of claim 5 wherein said fertilizer, when diluted with water, has a pH of about 5.0 to 7.5.

7. A method of improving plant growth comprising feeding plants a water diluted concentrated phosphorus containing fertilizer comprising:
   (A) a first phosphorus containing component, selected from the group consisting of phosphorous acid, hypophosphorous acid, polyphosphorous acid, polyhypophosphorous acid, and salts thereof;

(B) a second phosphorus containing component, selected from the group consisting of phosphoric acid and salts thereof and polyphosphoric acid and salts thereof;

the ratio of said first phosphorus component to said second phosphorus component is in the range between one to twenty and twenty to one by weight; said concentrated phosphorus fertilizer being a stable solution; and when said concentrated phosphorus fertilizer is diluted with water, a substantially fully soluble fertilizer is formed having an acceptable pH which is suitable for phosphorus uptake by plants and wherein the combination of said components (A) and (B) improves phosphorus uptake by plants more than if an equivalent amount of either said component (A) or said component (B) were used alone.

8. The improved phosphorus fertilizer of claim 7 wherein said fertilizer, when diluted, has a pH of from about 5.0 to about 7.5.

* * * * *